March 15, 1927.

A. MOORHOUSE

MOTOR VEHICLE

Filed March 29, 1923    2 Sheets-Sheet 1

1,620,731

INVENTOR:
Alfred Moorhouse,
BY
Milton S. Abbott
ATTORNEY

INVENTOR:
Alfred Moorhouse,
BY
ATTORNEY.

Patented Mar. 15, 1927.

1,620,731

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed March 29, 1923. Serial No. 628,534.

This invention relates to motor vehicles and particularly to the steering mechanism thereof.

One of the objects of the invention is to provide a steering mechanism of simple construction and attractive appearance.

Another object of the invention is to provide a steering mechanism in which the control devices are mounted in a depression in the upper end of the steering post so that they will be readily accessible to the operator and yet not present an unattractive appearance.

Another object of the invention is to provide housing means for the control connections at the upper end of the steering post, together with frictional setting means for the control devices.

Another object of the invention is to provide a housing for the control devices at the upper end of the steering post while at the same time connecting said housing through the steering post to a stationary part of the steering column at the lower end thereof.

The above and other objects of the invention will appear from the following description taken in connection with the drawings, which form a part of this specification, and in which.

Figure 1:
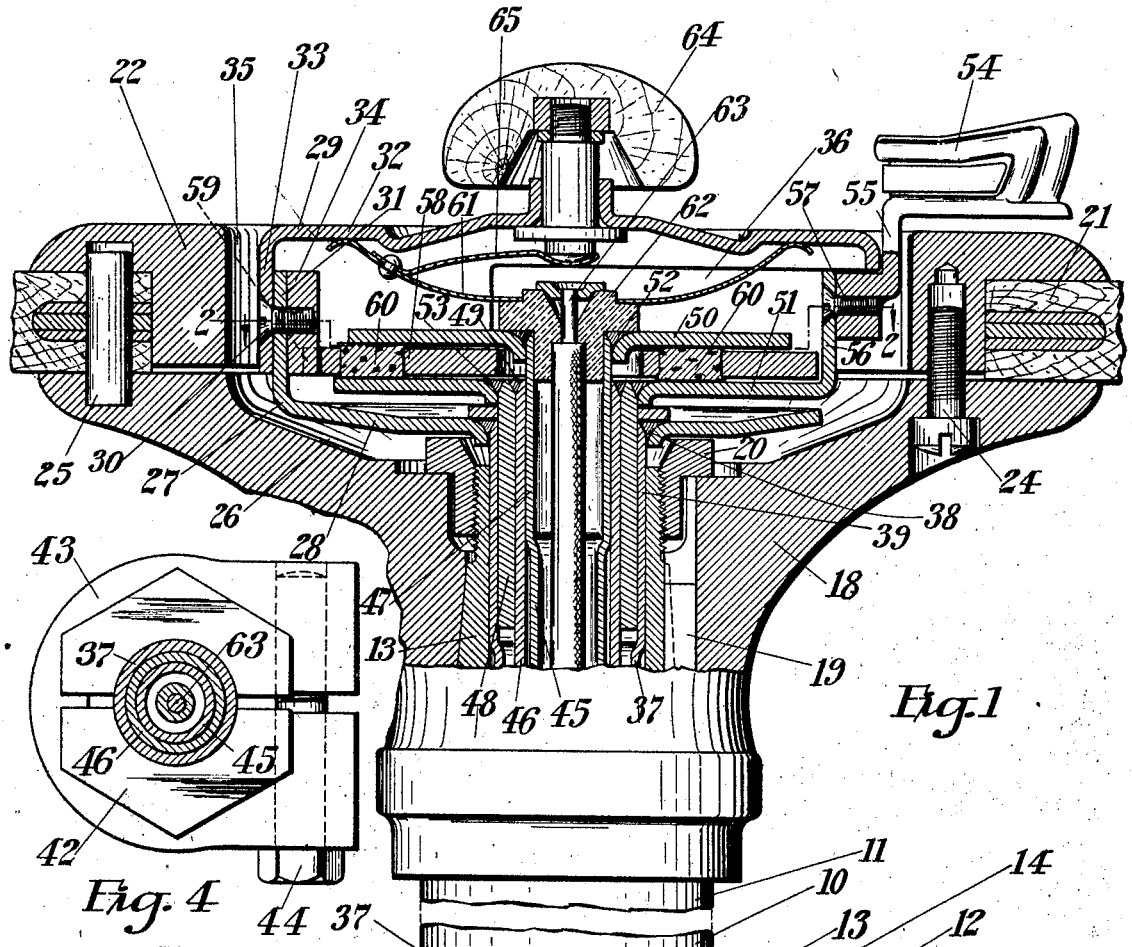
Fig. 1 is a view, mostly in section, of a steering mechanism made in accordance with this invention.

In the drawings, for the purpose of convenience, a steering mechanism is illustrated as set in a vertical position. Usually the steering mechanism of a motor vehicle is set at an angle and sometimes the axis of the gearing is set very near to the horizontal, but the position thereof is immaterial so far as the present invention is concerned. It will be understood, however, that the terms "upper" and "lower" are relative merely, as used in this specification.

Referring to the drawings, 10 represents the stationary part of a steering column, the steering column comprising not only the tubular part 11 but also the enlarged housing part 12 at the lower end of the tube. It will be understood that this steering column is adapted to be suitably mounted on the frame or other part of a motor vehicle so that the steering arm which projects from it may be connected to the steering wheels of the vehicle and so that its upper end may be arranged adjacent the driver or operator. The steering column itself is a stationary part and in it is mounted for rotation therein a steering post 13. This post is in the form of a tube and preferably has a worm 14 keyed to its lower end and suitable bearings 15 are provided for the lower end of the tube and its worm, these bearings being mounted in the housing part 12 of the steering column. They are accessible through an opening closed by a cover 16 secured to the part 12 as by a series of bolts 17.

The upper or free end of the steering post 13 is enlarged somewhat for the reception of the steering wheel, and as shown herein, this upper enlarged part is made of a separate piece and is indicated at 18. This part 18 is keyed to the steering post 13 as by a key 19 and a nut 20 threaded on the end of the post 13. Preferably the upper end of the tubular post 13 is tapered so that there will be a taper and key fit for the part 18 on the end of the post.

The enlarged part 18 of the steering post forms a support or bracket for a steering wheel 21, the hub only of which is shown in Fig. 1. The steering wheel itself is shown in plan in Fig. 3. In the form shown the steering wheel 21 is of wood and it is arranged to be clamped to the part 18 by a clamping ring 22 which, according to this invention, is made in two segmental parts or sections, divided on the line 23 as shown particularly in Fig. 3. By thus dividing the clamping ring 22 its parts may be removed from the hub of the steering wheel 21 without interfering with the handles of the control devices hereinafter described and as will hereinafter more fully appear.

The clamping of the steering wheel hub between the ring 22 and the head or part 18 of the steering post is accomplished by a series of screws or bolts 24 extending through the part 18 into threaded openings in the ring 22. Also, for the purpose of insuring that the steering wheel 21 will turn with the steering post dowel pins 25 are provided.

The upper part of the steering post as formed by the parts 18 and 22 is recessed or formed with a cylindrical depression 26, in its upper face. This depression is for the purpose of receiving the motor control devices and their housing so that those parts will not extend above the plane of the steering wheel itself and so that the whole will present a neat and attractive appearance.

Figure 2:
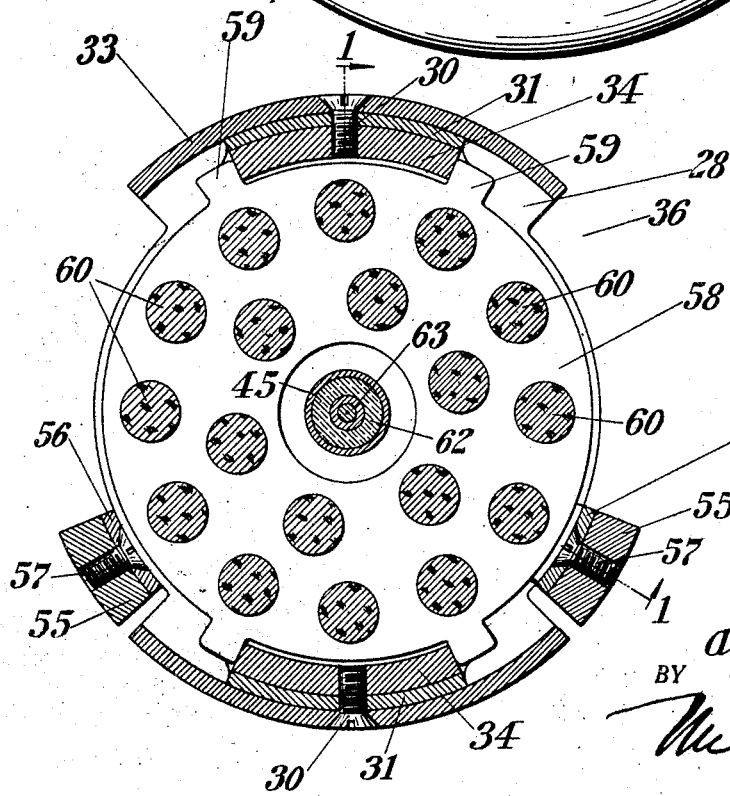
Fig. 2 is a transverse section approximately on the line 2—2 of Fig. 1.

The housing for the motor control devices above referred to is indicated at 27 and it is shown as formed of two parts 28 and 29 secured together by screws 30 as shown particularly in Figs. 1 and 2. The lower part 28 is of disk shape and is provided with two or more upstanding ears 31 and the part 29 has an end wall 32 and a cylindrical side wall 33 which is secured to the ears 31 by the screws 30 above referred to, the ears fitting just inside of the wall 33. Blocks 34 may be secured to the inner walls of the ears 33 to form a better securing means for the screws 30 and to act as a stop or key as will hereinafter appear.

The outer diameter of the housing 27 is somewhat less than the inner diameter of the recess 26 so that a circular slot 35 is formed between the housing and the inner wall of the recess. Also, the side wall 33 of the housing is formed with suitable openings 36 to accommodate the movable motor control devices which extend therethrough and through the slot 35, as will be hereinafter described.

The housing 27 is supported in the recess 26 by a tubular member 37, the upper end of this member being welded to the part 28 of the housing as shown at 38. The upper end of the tube 37 throughout the greater part of its length is slightly smaller than the interior diameter of the steering post 13 and readily fits within it, but the upper end of the tube is enlarged as shown at 39 to fit more snugly in the steering post and form a bearing therein so that the post may turn relatively to the tube 37 without undue friction. The lower end of the tube 37 extends through an opening in the middle of the cover 16 of the steering column, and as shown the lower end of the tube 37 is slightly contracted so that it will form a bearing for one of the control tubes that pass through it.

Figure 4:
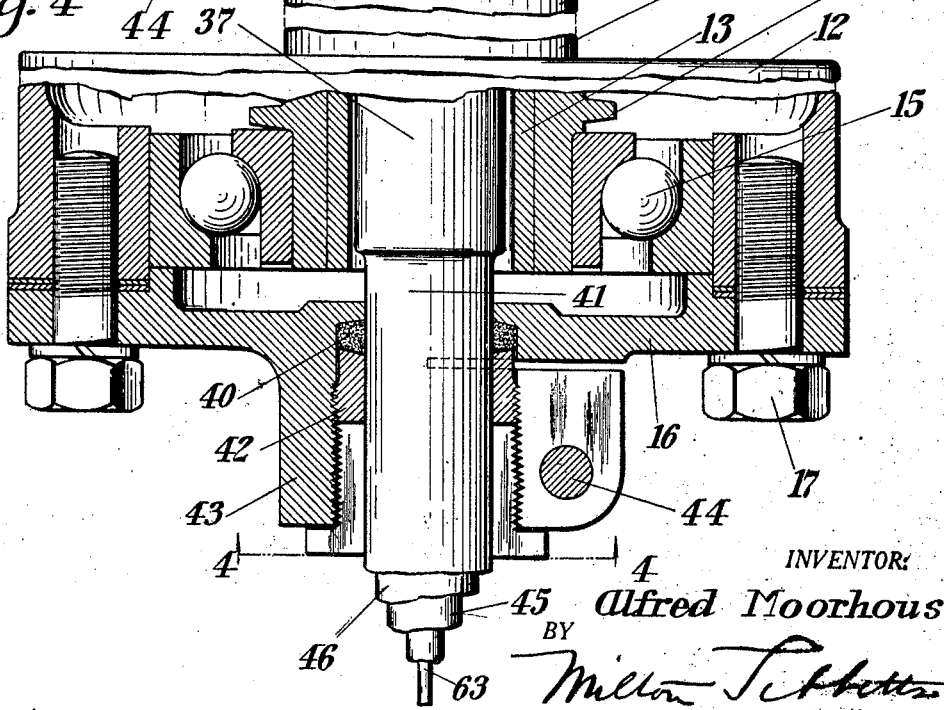
Fig. 4 is a section on the line 4—4 of Fig. 1.

For the purpose of preventing escape of lubricant from the housing 12 and for holding the tube 37 and the housing 27 in stationary position, that is, against turning and against longitudinal movement of the tube, a clamping and packing means is provided at the lower end of the steering column. This means includes packing material 40 surrounding the contracted end 41 of the tube 37, a split nut 42, and a clamping boss 43 shown as an integral part of the cover 16. The split nut 42 is threaded in the boss 43 and by screwing it in against the packing material 40 a tight joint is made between the tube 37 and the opening in the cover 16. After this is accomplished the clamping boss 43 may be contracted around the nut 42 by drawing up on a bolt 44 which passes through the two parts of the split boss, as shown particularly in Figs. 1 and 4.

In disassembling these parts it will be understood that it is only necessary to loosen the bolt 44 (which will unclamp the split nut 42) and unscrew the nut 42 to relieve the pressure of the packing material 40 on the tube 37, and the tube and the housing 27 at the upper end of the steering post may be withdrawn upwardly and out of the steering post. In assembling the reverse operation takes place and when the housing 27 has been properly positioned in the recess 26 the nut 42 is screwed in and the bolt 44 is tightened to thereby clamp the tube 37 and the housing 27 in their set position. They will then remain stationary and the steering post 13 and its head 18 may rotate about them.

Referring again to the housing for the motor control devices seated in the recess 26 at the upper end of the steering post, it will be seen that there are two tubes 45 and 46, one within the other, and both mounted within the tube 37 above described. The upper ends of these tubes 45 and 46 extend into the housing 27 and their upper ends are slightly enlarged so that the inner tube 45 may have a bearing in the upper end of the tube 46 and the latter may have a bearing in the upper end of the tube 37. The enlargement of the inner tube is indicated at 47, and the enlargement of the tube 46 is formed by a sleeve 48 which is welded or otherwise secured to it as at 49. The tubes preferably extend entirely through the tubular member 37 and at their projecting lower ends they are adapted for connection to the throttle valve and spark control respectively of the motor, or to other suitable motor control mechanism.

Figure 3:
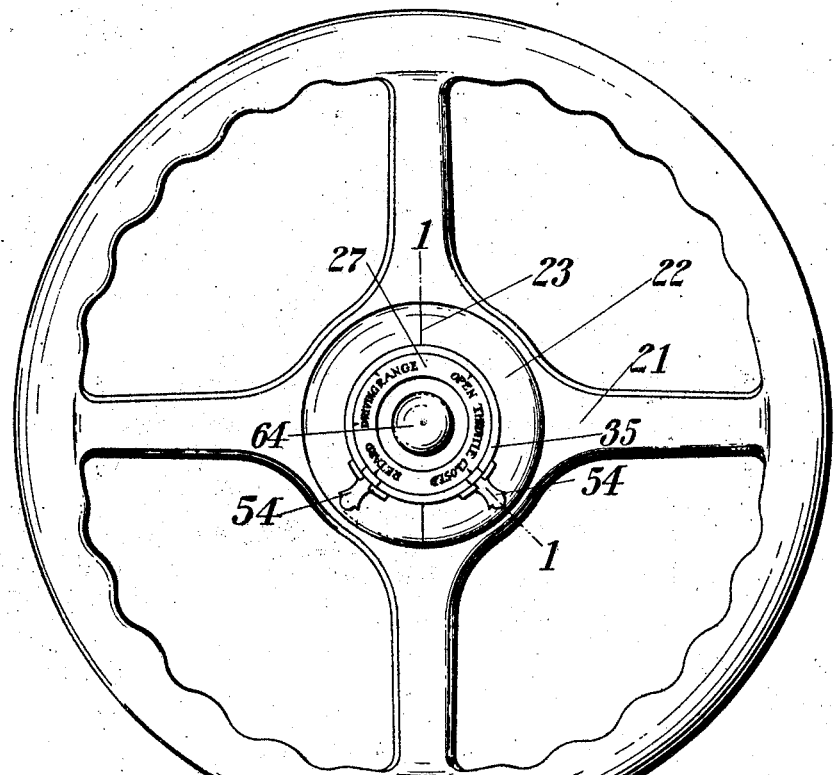
Fig. 3 is a plan view of the upper end of the steering mechanism shown in Fig. 1, assuming that the steering mechanism is set in vertical position.

At their upper ends the tubes 45 and 46 are provided with separated disks 50 and 51 respectively, the disk 50 being welded or otherwise secured to the tube 45 as at 52 and the disk 51 being welded or otherwise secured to the tube 46 as at 53. Each of these disks is provided with an operating handle 54 the shank 55 of which extends through the slot 35 and the opening 36 for connection to an ear 56 on its respective disk, a screw 57 securing the shank to the ear. This construction is shown in Figs. 1 and 2. Only one of the handles 54, however, is shown in Fig. 1 but both shanks 55 are illustrated in Fig. 2. Both of the handles 54 and their positions above the steering wheel are illustrated in Fig. 3 and it will be understood that they may be moved about the axis of the steering post to rotate the tubes 45 and 46 to thereby control the various devices of the motor.

Arranged between the disks 50 and 51 is a friction disk 58 which is held against turning movement by radially projecting ears 59 arranged on either side of the blocks 34 above referred to, these blocks being a part of the stationary housing 27. The disk 58 has numerous cork inserts 60 arranged in openings in the disk and projecting slightly from both sides thereof.

A spring 61 arranged between the disk 50 and the upper wall 32 of the housing 27 yieldingly presses the disks 50 and 51 in frictional contact with the corks of the disk 58 so that the tubes 45 and 46, to which the disks 50 and 51 are respectively connected, are frictionally retained against turning movement and thus the motor control devices are held in their set positions.

It will be seen that the spring 61 rests against a plug 62 which is inserted in the upper end of the tube 45 and rests against the disk 50, instead of being in direct contact with the disk 50. This plug is preferably of fibre or other insulation material and it carries the upper end of an insulated wire 63 which extends through the tube 45 and out at its lower end. This wire is adapted for connection to the electric horn and a battery, the other side of the battery being grounded on the frame of the vehicle and consequently on the steering column 10. For sounding the horn it is only necessary to ground the wire 63 and this is accomplished by a push button 64 mounted in an opening at the middle of the upper face of the housing 27. A spring 65, connected to the spring 61 as shown in Fig. 1, retains the button 64 in its upper or inoperative position and by pressing the button downwardly against the action of the spring 65, the latter, which is of course grounded on the steering column, makes contact with the upper end of the wire 63 thus closing the horn circuit.

It will be seen that the handles 54 of the motor control devices extend through the slot 35 and radially outward over the clamping ring 22. This is a very convenient position for the handles 54 and yet they would prevent removal of the clamping ring 22 were it not for the fact that that ring is made in two or more parts as described above. By making the ring in two parts the steering wheel 21 may be removed without disturbing the housing 27 merely by removing the screws 24 and turning the ring 22 so that one half of it is out from under the handles 54, then lifting that part of the ring out, and then turning the other half of the ring to the same position and removing it also. This will permit the steering wheel 21 to be removed from its support. This will also make accessible the screws 30 which retain the upper part 29 of the housing on the lower part thereof and thus access is obtained to the interior of the housing. The housing 27 may also be opened without removing the steering wheel 21. Thus the clamping boss 43 may be released, the split nut 42 unscrewed, and the tube 37 and with it the housing 27, may then be pulled upwardly until the housing 27 is clear of the recess 36. The screws 30 may then be removed and the upper part of the cover 29 taken off.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a steering mechanism, the combination with a steering post having an enlarged end, said end being formed with a recess therein, a housing mounted in and enclosing said recess except a small space between the walls of the housing and said recess and motor control devices arranged in said housing with parts thereof projecting through the space between the housing and the recess.

2. In a steering mechanism, the combination with a steering post having an enlarged end, said end being formed with a recess therein, of a stationary housing mounted in said recess with but small play, motor control devices in said housing and parts of the control devices projecting between the housing and wall of the recess.

3. In a steering mechanism, the combination with a rotatable steering post having an enlarged end with a recess therein, of a stationary housing arranged in said recess to leave a space between its outer wall and the wall of said recess, motor control devices in said housing and handles for said devices extending from the housing through said space.

4. In a steering mechanism, the combination with a rotatable steering post having an enlarged end with a circular recess therein, of a substantially cylindrical housing stationarily mounted in said recess and filling the same except for a small annular space around the periphery of said housing, motor control devices in said housing and parts of the control extending through the housing and said annular space.

5. In a steering mechanism, the combination with a steering post having a bracket secured to its end and forming a steering wheel support, a steering wheel on said support, a clamping ring formed of a plurality of arc shaped parts and resting on said steering wheel, means for detachably securing the parts of said ring to said support and thereby clamping the steering wheel to said support, and control devices mounted adjacent the end of said steering post and extending radially over said clamping ring.

6. In a steering mechanism, the combination with the steering column, of a plurality of control devices extending through the column and having separated parts at their upper ends, handles for said control devices, and a friction member arranged between said separated parts and adapted to frictionally hold the devices in set position.

7. In a steering mechanism, the combination with the steering column, of a stationarily mounted housing at the end of said column, control devices extending through said column and into said housing, said control devices having separated plates attached to their upper ends, handles attached to said plates for moving said control devices, and a friction disk mounted in the housing between said plates.

8. In a steering mechanism, the combination with the steering column, of a stationarily mounted housing at the end of said column, control devices extending through said column and into said housing, said control devices having separated plates attached to their upper ends, handles attached to said plates for moving said control devices, and a friction disk mounted between said plates and held by said housing against rotary movement.

9. In a steering mechanism, the combination with a housing on the steering column, of a plurality of control devices extending into said housing, said control devices having separated plates connected to them, a friction disk arranged between said plates and held by the housing against rotary movement, and a spring arranged to press the plates towards said disk.

10. In a steering mechanism, the combination of a steering post having an enlarged end, said end being formed with a recess therein, a housing mounted in said recess substantially flush with the end of said post, motor control devices in said housing, and frictional setting means therefor between said devices within the housing.

11. In control devices, the combination with a housing, of control connections therein, a spring to frictionally set said control connections, a push button, and a spring for said push button mounted on the first said spring.

12. In control mechanism, the combination of a housing, control devices extending into said housing and each having a plate, the plates of two of said devices being separated from each other, a friction disk arranged between said plates and held by said housing against turning movement, and handles for said plates extending through the sides of said housing.

13. In a steering mechanism, the combination with a steering column of a steering post extending through the upper end thereof, a substantially flat steering wheel secured to said post at the upper end thereof, and control devices mounted within the post substantially in the plane of said wheel.

14. The combination in a steering gear for motor vehicles of a dished steering head having an upwardly disposed annular face, a steering wheel, and a clamping ring associated with the head to clamp the wheel to said face.

15. The combination in a steering gear for motor vehicles of a dished steering head having an upwardly disposed annular face, dowel pins projecting from the face, a steering wheel having a hub portion provided with holes adapted to cooperate with the dowel pins, and means associated with the head and cooperating with the dowel pins to clamp the wheel against the face.

16. In a steering mechanism, the combination with the stationary steering column of a tubular steering post mounted for turning movement therein and having an enlarged end beyond one end of the steering column, said enlarged end having a recess, a housing in the recess, a control assembly comprising a tube disposed in the steering post and secured to the housing, control devices in said tube having terminal portions in said housing, a cover plate for the lower portion of the steering column through which the control assembly projects, and means clamping said tube to the cover plate against turning and against longitudinal movement.

17. A steering gear for motor vehicles including a tubular steering column, a tubular steering post disposed therein having an upper end providing a recess, a stationary tubular casing in said post projecting into the recess, a housing in said recess fixed to said tubular casing, control devices in said housing projecting through said casing and comprising with said casing and housing a removable control assembly, and means engaging the lower end of the casing to clamp it against movement with respect to the steering column.

In testimony whereof I affix my signature.

ALFRED MOORHOUSE.